Dec. 10, 1963  A. KALLEL ETAL  3,113,502
VALVE DEVICE
Filed July 25, 1961
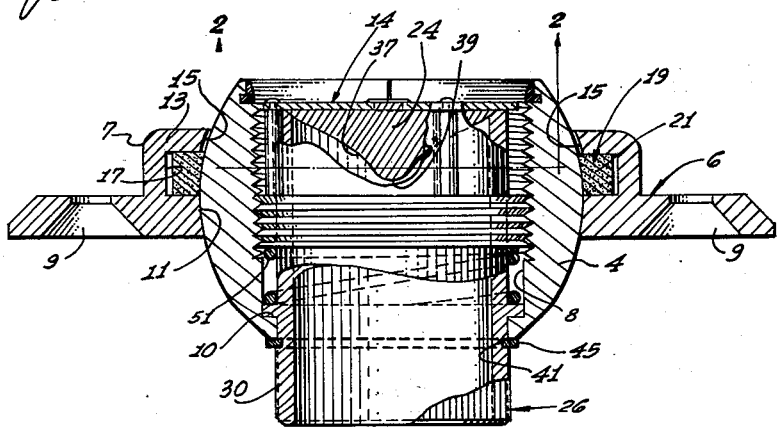
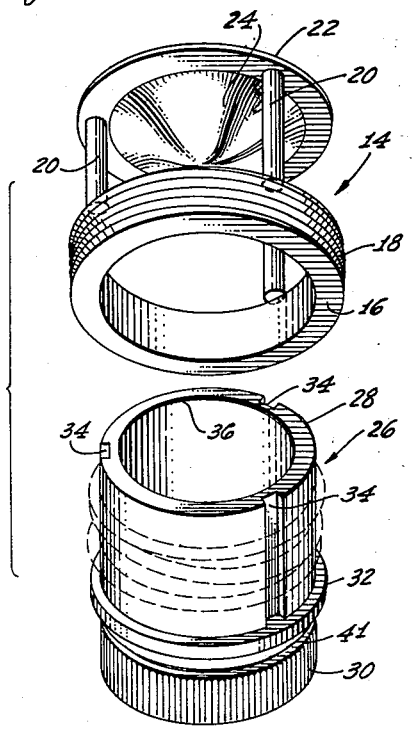
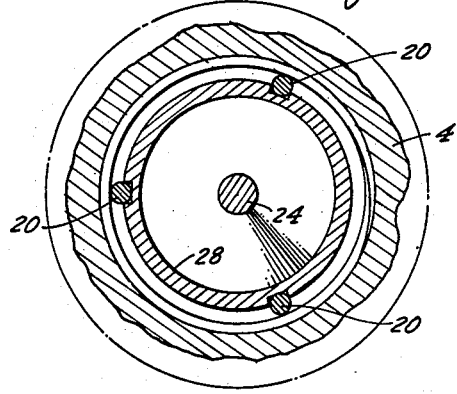
INVENTORS:
Frank J. Mutich
Allen Kallel
Attorneys

United States Patent Office 3,113,502
Patented Dec. 10, 1963

3,113,502
VALVE DEVICE
Allen Kallel and Frank J. Mufich, Los Angeles, Calif., assignors to Wemac Co., Inglewood, Calif., a corporation of California
Filed July 25, 1961, Ser. No. 126,717
6 Claims. (Cl. 98—40)

The invention relates to a valve device and specifically to an improved valve arrangement of the type frequently employed in common carriers to provide individual passenger air and accommodate individual selectable adjustment thereof.

As well known to those familiar with this art, passenger comfort on many common carriers, such as aircraft, requires a system of piping pressured air to the individual passenger at his seat. The pasengers' physical comfort is enhanced by merely feeling the moving air. In addition, the passenger frequently finds himself in an environment of reduced air pressure which, even though sufficient for all bodily conditions, nevertheless contributes to physical and psychological discomfiture. It has been found that the presence of the correct volume of moving air at passenger seat location contributes to passenger comfort, both mental and physical, in this unusual environmental circumstance.

Many of the valves which have heretofore been proposed and used for this service were subject to certain objections from the standpoint of passenger and technical requirements. For example, insufficient air flow has been found to be annoying to passengers and, likewise, insufficient individual control of the specific volume of air directed at each passenger has been found undesirable. That is to say, in may of the valves it was found that fine adjustment between the valves closed and full open position was not offered.

In addition, some of the structures were of such complex internal design that they resulted in a variable or turbulent flow of air rather than the more desirable laminar flow. It was also found that many of the structures accidentally created what was, in effect, a pipe resonator whereby an objectionable noise or whistle occurred at some or all levels of air flow.

In addition to meeting the above requirements, it is desirable, especially in aircraft, that the valve per se be of such structural design as to be extremely light in weight. The design further should afford economy of initial cost and be structurally sound so as to provide long service life without partial breakdowns due to valve leaking, valve sticking or other difficulties which render the valve wholly or partially inoperative.

A further factor influencing this service is the fact that the systems in use can be divided into low pressure systems, high pressure systems and variable pressure sytems. Of course, in the first and second types, the pressure in the systems is determined by a pressure creating mechanism, such as an air pump, at the source. In these, most frequently employed in pressurized aircraft cabins, the pressure differential to maintain flow may be kept relatively uniform. In variable pressure systems, such as for example, where ram force of the aircraft in motion is used to maintain the pressure differential circulating system, the air admitting valve must function under a range of pressure differentials. It is highly advantageous that a given valve design be such that it may meet the use requirements of all systems.

With the above in mind, it is the purpose of the herein disclosed valve arrangement to provide a valve that is in fact light in weight and low in initial cost. The design further has structural characteristics that provide desirable air flow and air flow adjustment under a wide range of service applications. An improved seal guards against air leakage and an improved force transmitting connection accommodates fine adjustment throughout a long service life.

Specifically, the valve comprehends a main body of multiple truncated spherical design which is received in a complementing housing whereby the valve is mounted for swivelling universal movement through a large range of angular adjustment. Further, the valve includes a seal carrying member in threadable engagement with the swivelling body and having thereon a seal element arrangement to move reciprocally into and out of engagement with a valve seat member which is mounted for rotation in the body and extends therefrom for easy passenger adjustment. The design further comprehends a new and improved driving or force transmitting connection between the seal carrying element and the rotatable element that accommodates a virtual infinite variation of air flow throughout the valve range and still offers a sound driving connection that will provide the desired long service life. In addition, the structure offers air flow characteristics which provide smooth non-turbulent laminar flow throughout the entire range of valve adjustment.

These and other improvements of the herein disclosed structure will be more readily understood by reference to the following specification and an examination of the associated drawings, wherein:

FIGURE 1 is a side elevational assembled view of the valve arrangement partially in section;

FIGURE 2 is a fragmentary sectional view taken substantially along lines 2—2 of FIGURE 1; and FIGURE 3 is a composite perspective view of the movable members employed in the valve arrangement.

Describing the invention in detail and directing attention to the assembled view of FIGURE 1, it will be seen that a valve body 4 is provided, said body having the form of a zone of a sphere. The body 4 is complementally received in a housing 6 whereby a large degree of angular and rotative movement of the body is accommodated. The univerasl connection between the body and the housing will be more clearly understood when it is considered that the housing 6 comprises a bracket 7 which is secured to the vehicle in any conventional manner such as by screws (not shown) which may be received in the apertures 9. The bracket 7 is, of course, so mounted in the vehicle that the upper portion of the valve as seen in FIGURE 1 is in communication with a manifold (not shown) of the pressured air delivery system. The bracket 7 is provided with a circular opening 11 which is defined at its upper end by the annularly apertured collar 13. The surface of the opening 11 generally defines a zone of a sphere to complement the spherical zonal formation of the body 4. A pair of diametrically opposed arcuate curves or grooves 15 are formed in the bracket 13 which permit the insertion into the bracket of the valve body 4 when the latter is rotated to a position normal to that shown in FIGURE 1. Upon insertion, the body is, of course, again rotated to the position illustrated and assembly of the body to the housing 6 is complete. It will now be understood how the valve body 4 is mounted for universal movement relative to the housing 6.

To frictionally hold the valve body in a desired position of adjustment relative to the housing, the bracket 13 is provided with the mentioned annular groove 17 which receives a packing gasket 19, the latter being radially inwardly biased by spring elements 21 disposed annularly around the outer periphery of the gasket 19. The gasket may be formed of any suitable material but is preferably formed of a fibrous material such as felt or the like. In addition to frictionally holding the valve body in the desired adjusted position, the felt gasket 19 also provides a seal to avoid air leakage from the pressured system at the juncture of the valve body 4 in the housing 6.

The valve body 4 further comprises a passageway 8 which extends therethrough in generally perpendicular relation to the truncated upper and lower portions of the valve body. The lower end of the passageway 8, as seen in FIGURE 1, is provided with an inwardly directed annular shoulder 10 which defines the lower limit of the passageway.

Directing attention to FIGURE 3, it will be noted that a seal carrying member, indicated generally at 14, comprises a lower annular ring 16 having peripheral threads 18 formed in the outer surface thereof. A plurality of spacing pins or bars 20 project upwardly from the ring 16 and carry at the upper end thereof a secured cap 22. The pins 20 project slightly inwardly of the inner diameter of the ring 16, and, in the preferred arrangement illustrated, extend parallel to the longitudinal axis of the member 14 and are in equal angular spaced relation to each other. The cap 22 is provided with a seal element 24 which may be integral with or secured to the lower side thereof.

Careful attention should be given to the seal element 24. For example, to insure long service life as well as proper sealing, the element 24 is preferably composed of a flexible material which will provide an effective seal when closed but yet is of such resiliency that it will not score or groove even after extended use. It has been proposed to use certain synthetic rubber products or, in the alternative, certain plastic materials such as nylon or certain silicon compounds. In addition to the composed material the physical structure of the seal 24 is important. It will be noted that the seal is of inverted modified conical form, when seen in cross-section, and is characterized by a surface 35 of generally annular conical form arcuately blending as at 37 with a convex center section 39. The purpose of this particular construction will be hereinafter described.

A second or adjusting member is indicated generally at 26 in FIGURE 3. The adjusting member 26 comprises a tube 28 having a knurled operating portion 30 at the lower end thereof. An annular peripheral shoulder 32 is outwardly formed on the member 26 immediately above the knurled portion 30. A slot 41 is provided in the portion 30 in parallel spaced relation to the shoulder 32. Further, a plurality of longitudinally extended slots 34 are formed in parallel axis relation in the outer surface of the member 26 and in spaced complemental relation to the spacing of the pins 20 of the member 14. The slots 34 extend generally from the shoulder 32 to the upper end of the member 26.

Directing attention to the assembled arrangement of FIGURE 1, it will be noted that the member 14 is threadably mounted within the passageway 8 by virtue of the connection between the threads 18 and the threads 12 of the body 4. It will, therefore, be apparent that rotative motion of the member 14 produces a coaxial reciprocating motion thereof and particularly of the carried sealing element 24. The member 26, on the other hand, is disposed in the passageway 8 with the shoulder 32 in abutment with the ledge 10 of the body 4. The abutting contact between the shoulder 32 and the ledge 10 permits rotary motion of the member 26 and, in addition, provides a seal therebetween. A clip 45 may be positioned in the slot 41 immediately below the body 4 to provide longitudinal stability for the member 26. The knurled portion 30 of the member 26 extends below the body 4 for easy access by the operating passenger. The upper segment of the member 26 projects into and is telescopically received within the passageway 8 as well as within the member 14 so that the pins 20 are complementally received within the slots 34. A spring 51 is annularly disposed within the passageway 8 and is pressured interposition between the shoulder 32 of the member 26 and the lower surface of the annular ring 16 of the member 14. The spring, of course, functions to maintain a biasing pressure on the internally movable members acting as a slack takeup and maintaining a firm non-rattling relation between the body and members. It will thus be apparent that the member 26 is subject to manual rotation within the body 4 and that, upon rotation thereof, force is transmitted via the pins 20 and slots 24 to the member 14, thus providing the driving connection between the members. Because of the threaded connection between the member 14 and the body 4, the transmitted force induces coaxial longitudinal motion to the member 14 or, to restate, relative reciprocal motion between the members 14 and 26, the direction of motion depending upon the direction of rotation of the member 26.

In the closed position of the valve, it will be noted that the seal element 24 is in intimate contact with a machined valve seat 36 formed on the upper end of the member 26 providing an effective seal. Opposite rotation of the member 26 and corresponding upward movement of the member 14 raises the seal 24, thus accommodating passage of air through the valve device. It will be particularly understood that accurately varied amounts of flow air may be provided by merely adjusting the degree of separation between the seal element 24 and the valve seat 36. Thus, the valve device illustrated affords virtual infinite variation between its closed and open position.

It will be apparent to those familiar with this art that the structure shown provides a valve of relatively simple design and extremely light in weight. In addition, the form of the element 24, as seen in cross-section, cooperates with the unobstructed central opening of tube member 26 to provide smooth laminar type flow of air through the device at all positions of valve setting. The unique driving connection between the members 14 and 26 provides for smooth operation and long service life. The biasing effect of the spring 51 further maintains a firm relationship between the relatively movable members and avoids service rattling or the like even under extreme conditions of vibration.

As noted, the valve structure herein disclosed meets all the passenger and service requirements for the type of device. In addition to functioning effectively in high pressure systems, the arrangement offers particular advantage in low and variable pressure systems. The structural combination offering smooth flow and fine adjustment is particularly effective in offering the correct air flow volume in the latter systems to provide passenger comfort and quiet, efficient operation.

The device as illustrated is by way of illustration and not limitation and may be subject to modification without departing from the scope of the appended claims.

We claim:

1. In a valve device,
   an annular valve body,
   an axially elongated tube with a smooth inner circumferential surface rotatably telescoped into said body,
   means securing the telescoped tube against axial movement relative to the body,
   said body and tube forming an obstacle-free passageway for fluid flow through the body with the tube forming the major length of the passageway,
   said tube being exposed at the outer end of the passageway for manual rotation and to serve as a discharge nozzle,
   valve means to regulate flow through the passageway,
   annular control means to control said valve means in response to rotation of the tube, said annular control means being telescoped between the body and the tube, said control means having thread means engaging threads on the inner surface of the hollow body,
   one of said tube and said annular control means being provided with longitudinal grooves and the other of said tube and said annular control means being provided with portions in sliding engagement with said grooves for slidingly keying the annular control means to the tube, and means operatively connecting said control means to the valve means for operation of the valve means, said connecting means extending from the control means longitudinally thereof outside of the inner diameter of said passageway.

2. A combination as set forth in claim 1 in which said connecting means comprises a plurality of circumferentially spaced elements slidably engaging corresponding longitudinal grooves in the outer circumference of the tube.

3. A valve device according to claim 1, wherein said valve means includes a valve member formed as seen in elevation of a central conical section and a surrounding convex section, the two sections being blended together at their juncture.

4. A valve device according to claim 1, wherein said connecting means comprises at least three spaced elongated pins in parallel longitudinal relation on said annular control means, said tube having parallel elongated grooves receiving said pins, and spring means compressibly interposed between said control means and said tube.

5. A valve device according to claim 1 wherein said valve means includes a valve member of resilient material of generally conical form as seen in cross section.

6. A valve device in accordance with claim 5 wherein said valve member as viewed in profile has a plurality of blended arcs.

References Cited in the file of this patent
UNITED STATES PATENTS

| | | |
|---|---|---|
| 2,672,806 | Vehige | Mar. 23, 1954 |
| 2,974,580 | Zimmerman | Mar. 14, 1961 |